(12) United States Patent
Miller et al.

(10) Patent No.: US 12,742,884 B2
(45) Date of Patent: Sep. 22, 2026

(54) AIR-DATA SYSTEM WITH BACKGROUND LIGHT DETECTION USING A BACKGROUND REJECTION FILTER

(71) Applicant: Rosemount Aerospace Inc., Burnsville, MN (US)

(72) Inventors: Mark S. Miller, Lakeville, MN (US); Phillip Acott, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 648 days.

(21) Appl. No.: 18/360,730

(22) Filed: Jul. 27, 2023

(65) Prior Publication Data

US 2025/0035792 A1 Jan. 30, 2025

(51) Int. Cl.

*G01C 3/08* (2006.01)
*G01S 17/95* (2006.01)
*G01P 5/26* (2006.01)
*G01P 13/02* (2006.01)
*G01S 7/481* (2006.01)
*G01S 17/58* (2006.01)

(52) U.S. Cl.

CPC ................ *G01S 17/95* (2013.01); *G01P 5/26* (2013.01); *G01P 13/025* (2013.01); *G01S 7/4814* (2013.01); *G01S 7/4816* (2013.01); *G01S 17/58* (2013.01)

(58) Field of Classification Search

CPC ........ G01S 17/95; G01S 17/58; G01S 7/4814; G01S 7/4816; G01P 5/26; G01P 13/025
See application file for complete search history.

(56) References Cited

U.S. PATENT DOCUMENTS 6,034,760 A * 3/2000 Rees ....................... G01S 17/95 356/342
8,072,584 B2 12/2011 Caldwell et al.
10,451,518 B2 10/2019 Mamidipudi et al.
(Continued)

OTHER PUBLICATIONS

Extended European Search Report dated Nov. 26, 2024, for corresponding European Patent Application No. 24191505.7, 10 pgs.

*Primary Examiner* — Mark Hellner
(74) *Attorney, Agent, or Firm* — Kinney & Lange, P.A.

(57) ABSTRACT

Apparatus and associated methods relate to improving measurement of metrics determined by laser air-data systems subject to unwanted background light. Such measurements are improved by estimating and excising the unwanted background light from the total light received by an optical receiver which receives a Doppler-shifted reflected portion of a projected beam of light backscattered by aerosols and air molecules of an atmosphere. The background light is estimated using a background-light rejection filter that separates the light received by the optical receiver into a beam sampling portion and a complementary non-beam portion. The beam sampling portion has band-pass wavelengths that include the Doppler-shifted reflected portion and a portion of the unwanted background light. The complementary non-beam portion includes background light of wavelengths outside of the band-pass wavelengths of the beam sampling portion. The non-beam sampling portion is used to estimate the unwanted background light included in the beam sampling portion.

20 Claims, 7 Drawing Sheets

(56) References Cited

U.S. PATENT DOCUMENTS

| | | | | |
|---|---|---|---|---|
| 2009/0046289 | A1* | 2/2009 | Caldwell | G01P 13/025 356/341 |
| 2010/0277715 | A1 | 11/2010 | Caldwell et al. | |
| 2012/0169053 | A1 | 7/2012 | Tchoryk et al. | |
| 2015/0233962 | A1* | 8/2015 | Tchoryk | G01S 7/4808 356/28 |

* cited by examiner

AIR-DATA SYSTEM WITH BACKGROUND LIGHT DETECTION USING A BACKGROUND REJECTION FILTER

BACKGROUND

Some aircraft are equipped with laser air-data systems for optically measuring metrics of an atmosphere outside the aircraft. Such laser air-data systems project one or more beams of light, each typically a monochromatic beam of light, into the atmosphere. A reflected portion of each of the projected beams of light is then backscattered by aerosols (small particles that are suspended in the atmosphere, such as for example, dust, ash, water droplets, ice crystals, etc.), as well as by air molecules (e.g., $N_2$, $O_2$, $CO_2$, etc.) in the atmosphere. A wavelength spectrum (or frequency spectrum) of the reflected portion can be different from that of the projected beam. For example, the reflected portion can have a much broader wavelength spectrum than that of the projected beam of light, which is very narrow for a monochromatic beam of light. Moreover, amplitude variations within the spectrum of the reflected portion can arise. Such a wavelength spectrum of the reflected beam arises from the relative motions of the aircraft (or the laser air-data system) with respect to the backscattering aerosols in the atmosphere and with respect to the backscattering air molecules of the atmosphere. Such relative motions cause Doppler wavelength shifting (and corresponding Doppler frequency shifting) of photons reflected by aerosols and air molecules that are moving relative to the aircraft. Therefore, such relative motions of the aircraft with respect to the aerosols and/or air molecules, as well as other metrics of the atmosphere, can be determined from the wavelength spectrum of the reflected portion.

Although both aerosols and air molecules backscatter the projected beam of light, such backscattering is predominantly a result of different scattering mechanisms for aerosols versus air molecules. The size of the objects from which the light is backscattered determines which scattering mechanism predominates. For example, for air molecules, Rayleigh scattering typically predominates. For aerosols, Mie scattering typically predominates. Not only does the predominant scattering mechanism differ between aerosols and air molecules, but the spectrum corresponding to light backscattered by aerosols is also different than the spectrum corresponding to light backscattered by air molecules. Such differences arise because of differences in the relative motions of aerosols and air molecules. Aerosols are much larger than air molecules. Because aerosols are large in comparison to the air molecules, aerosols have a motion that is commensurate with whatever air currents are present in the atmosphere in which the aerosols are suspended. The air current can be thought of as an average of the motions of the air molecules. Aerosols all drift together with the air currents at nearly zero relative velocity with respect to one another. Thus, the wavelength spectrum of light reflected by aerosols is narrow, almost identical in width to the narrow spectrum of the projected beam of light. Although the width of the wavelength spectrum is like that of the wavelength spectrum of the projected beam of light, the actual wavelength that characterizes the wavelength spectrum of light reflected by aerosols (e.g., a mean wavelength or some other characterizing central wavelength of the spectrum) can be different from the wavelength that characterizes the wavelength spectrum of the projected beam of light. Such a difference between these two characteristic wavelengths is indicative of the relative motion of the aircraft with respect to the air currents present in the atmosphere in which the backscattering aerosols are suspended. These differences correspond to the relative airspeeds of the aircraft in the directions of the reflected portion backscattered by aerosols.

Because air molecules in the atmosphere are much smaller than the average distance between these air molecules, air molecules travel large distances (relative to their tiny size) between collisions with other air molecules. Such collisions between pairs of air molecules are largely elastic in nature. Although the average velocity of air molecules can be characterized by the velocity of the air current, the air molecules themselves typically have velocities of magnitudes that greatly exceed the magnitude of the velocity of the air currents. The kinetic theory of gases characterizes and quantifies such constant (between collisions), rapid, and random motions of air molecules. The root-mean-square (RMS) average of air molecules has been shown to be:

$$v_{RMS} = \sqrt{\frac{3k_B T}{m}}, \tag{1}$$

where $k_B$ is Boltzmann's constant, T is the temperature of the air, and m is the mass of each air molecule. For air molecules, such RMS average velocities are very high-much higher than typical airspeeds of flying aircraft. Not only is the RMS average velocity of air molecules very high, but the standard deviation of the velocities of air molecules is also very high. Such high standard deviations result in broadening of the wavelength spectrum of light backscattered by air molecules.

FIG. 1 is a graph depicting wavelength spectra of a monochromatic projected beam of light and light backscattered by aerosols and air molecules. In FIG. 1, graph 2 includes horizontal axis 4, vertical axis 6 and wavelength spectra $\mathbf{8}_{PROJ}$, $\mathbf{8}_{AERO}$ and $\mathbf{8}_{MOL}$. Horizontal axis 4 is indicative of wavelength, and vertical axis 6 is indicative of amplitude. Projected-beam wavelength spectrum $\mathbf{8}_{PROJ}$ corresponds to the projected beam of light. Projected-beam wavelength spectrum $\mathbf{8}_{PROJ}$ has a characterizing central wavelength of $\overline{\lambda}_{PROJ}$. Projected-beam wavelength spectrum $\mathbf{8}_{PROJ}$ has a characteristic breadth (e.g., full-width at half-maximum amplitude) of $\Delta\lambda_{PROJ}$. Aerosol-backscattered wavelength spectrum $\mathbf{8}_{AERO}$ corresponds to the light backscattered by aerosols in the atmosphere outside the aircraft. Aerosol-backscattered wavelength spectrum $\mathbf{8}_{AERO}$ has a characterizing central wavelength of $\overline{\lambda}_{AERO}$. Aerosol-backscattered wavelength spectrum $\mathbf{8}_{AERO}$ has a characteristic breadth of $\Delta\lambda_{AERO}$. Molecule-backscattered wavelength spectrum $\mathbf{8}_{MOL}$ corresponds to the light backscattered by air molecules of the atmosphere outside the aircraft. Molecule-backscattered wavelength spectrum $\mathbf{8}_{MOL}$ has a characterizing central wavelength of $\overline{\lambda}_{MOL}$. Molecule-backscattered wavelength spectrum $\mathbf{8}_{MOL}$ has a characteristic breadth of $\Delta\lambda_{MOL}$. Although depicted as separate spectra (i.e., aerosol-backscattered wavelength spectrum $\mathbf{8}_{AERO}$ and molecule-backscattered wavelength spectrum $\mathbf{8}_{MOL}$), the spectrum of the reflected portion will be a combination (i.e., a sum) of wavelength spectrum $\mathbf{8}_{AERO}$ and wavelength spectrum $\mathbf{8}_{MOL}$. The sum of aerosol-backscattered wavelength spectrum $\mathbf{8}_{AERO}$ and molecule-backscattered wavelength spectrum $\mathbf{8}_{MOL}$ can be referred to as a Doppler-shifted wavelength spectrum of the reflected portion.

Note that the characterizing central wavelength $\overline{\lambda}_{AERO}$ of light backscattered by aerosols is identical to the characterizing central wavelength $\overline{\lambda}_{MOL}$ of light backscattered by the air molecules. This is because the RMS average velocity of air molecules is equal to the air current. Therefore, the RMS average Doppler shift due to molecular backscattering is equal to the average Doppler shift due to aerosol backscattering. Note also that both characterizing central wavelengths $\bar{\lambda}_{AERO}$ and $\bar{\lambda}_{MOL}$ of light backscattered by aerosols and air molecules are not equal to the characterizing central wavelength $\bar{\lambda}_{PROJ}$ of the projected beam of light. This difference in the characterizing central wavelengths between $\bar{\lambda}_{PROJ}$ and either of $\bar{\lambda}_{AERO}$ Or $\bar{\lambda}_{MOL}$ is indicative of the airspeed of the aircraft with respect to the air current of the atmosphere outside the aircraft. Finally, note the similarities and differences in the shapes and breadths $\Delta\lambda_{PROJ}$, $\Delta\lambda_{AERO}$, and $\Delta\lambda$voι of the spectra $\mathbf{8}_{PROJ}$, $\mathbf{8}_{AERO}$ and $\mathbf{8}_{MOL}$, respectively. The specific shapes and breadths $\Delta\lambda_{PROJ}$, $\Delta\lambda_{AERO}$, and $\Delta\lambda_{MOL}$ of these spectra $\mathbf{8}_{PROJ}$, $\mathbf{8}_{AERO}$ and $\mathbf{8}_{MOL}$ are indicative of various metrics of the atmosphere, such as, for example, static air temperature, static air pressure, airspeed, as well as metrics of particles in the atmosphere. Such metrics can then be communicated to the pilot, crew and/or aircraft management system(s) of the aircraft so as to be used to control the flight of the aircraft.

SUMMARY

Some embodiments relate to a system for measuring air data of an atmosphere outside an aircraft. The system includes a light projector, an optical receiver, a background-light rejection filter and an air-data processor. The light projector is configured to project a beam of light into a projection volume of an atmosphere. The optical receiver is configured to receive light from a reception volume of the atmosphere. The reception volume and the projection volume form an intersection volume. The light received by the optical receiver includes: i) a Doppler-shifted reflected portion of the projected beam backscattered by the atmosphere from within the intersection volume; and ii) a background-light portion from within the reception volume. The background-light rejection filter is configured to separate the light received by the optical receiver into a beam sampling portion and a complementary non-beam portion. The beam sampling portion has band-pass wavelengths that include the Doppler-shifted reflected portion and a band-pass limited amount of background light. The complementary non-beam portion includes background light of wavelengths outside of the band-pass wavelengths. The air-data processor is configured to estimate the band-pass limited amount of the background light included in the beam sampling portion based on the complementary non-beam portion. The air-data processor is also configured to excise, from the beam sampling portion, the band-pass limited amount of the background light included in the beam sampling portion as estimated, thereby determining the Doppler-shifted reflected portion received by the optical receiver. The air-data processor is also configured to calculate metrics of the air data based on the Doppler-shifted reflected portion as determined.

Some embodiments relate to a method for measuring air data of an atmosphere outside an aircraft. In the method, a beam of light is projected, via a light projector, into a projection volume of an atmosphere. Light from a reception volume of the atmosphere is received, via an optical receiver. The reception volume of the optical receiver intersects the projection volume of the light projector, thereby forming an intersection volume. The light received by the optical receiver includes: i) a Doppler-shifted reflected portion of the projected beam backscattered by the atmosphere from within the intersection volume; and ii) a background-light portion of background light from within the reception volume. The light received by the optical receiver is filtered, via a background-light rejection filter, into a beam sampling portion and a complementary non-beam portion. The light received by the optical receiver is separated, via a background-light rejection filter, into a beam sampling portion and a complementary non-beam portion. The beam sampling portion has band-pass wavelengths that include the Doppler-shifted reflected portion and a band-pass limited amount of background light. The complementary non-beam portion includes background light of wavelengths outside of the band-pass wavelengths. The band-pass limited amount of the background light included in the beam sampling portion is estimated based on the complementary non-beam portion. The band-pass limited amount of the background light included in the beam sampling portion as estimated is excised from the beam sampling portion, thereby determining the Doppler-shifted reflected portion received by the optical receiver. Metrics of the air data are calculated based on the Doppler-shifted reflected portion as determined.

DETAILED DESCRIPTION

Apparatus and associated methods relate to improving measurement of metrics determined by laser air-data systems subject to unwanted background light. Such measurements are improved by estimating and excising the unwanted background light from the total light received by an optical receiver which receives a Doppler-shifted reflected portion of a projected beam of light backscattered by aerosols and air molecules of an atmosphere. The background light is estimated using a background-light rejection filter that separates the light received by the optical receiver into a beam sampling portion and a complementary non-beam portion. The beam sampling portion has band-pass wavelengths that include the Doppler-shifted reflected portion and a portion of the unwanted background light. The complementary non-beam portion includes background light of wavelengths outside of the band-pass wavelengths of the beam sampling portion. The non-beam sampling portion is used to estimate the unwanted background light included in the beam sampling portion.

Figure 2:
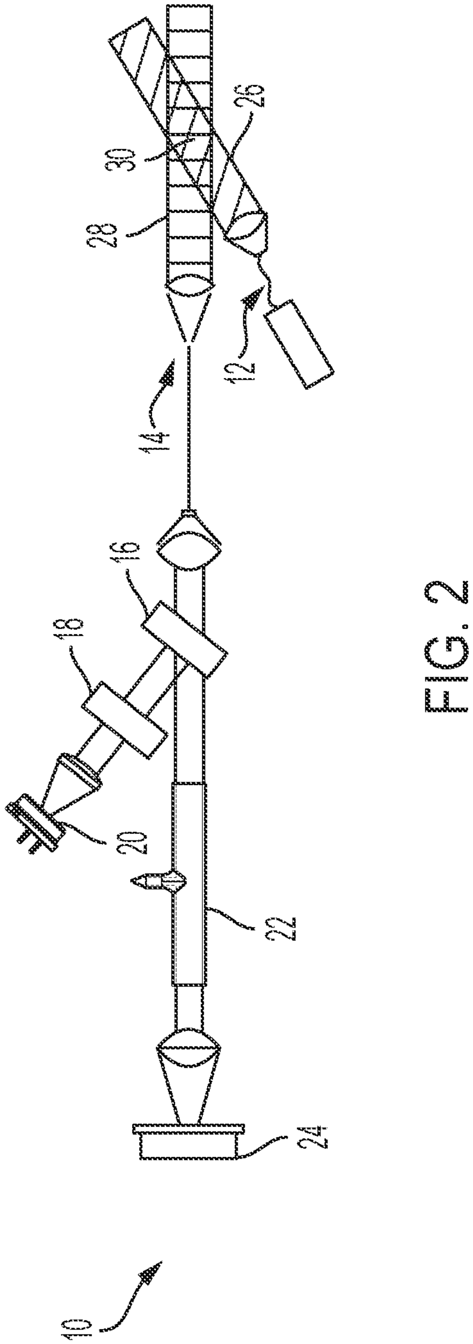
FIG. 2 is a schematic diagram of a laser air-data system that has background-light sample and correction capability.

FIG. 2 is a schematic diagram of a laser air-data system that has background-light sample and correction capability.

Figure 1:
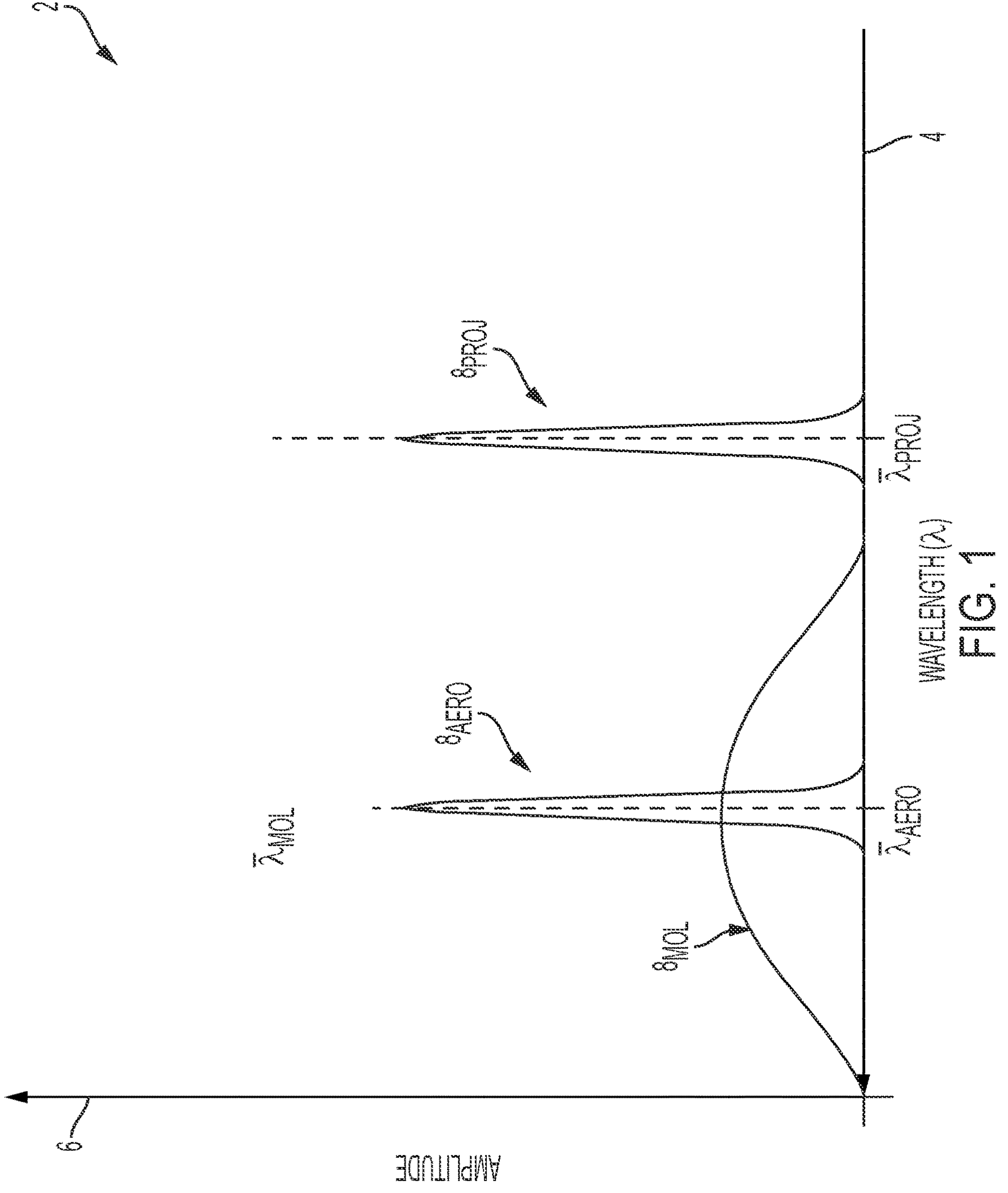
FIG. 1 is a graph depicting wavelength spectra of a monochromatic projected beam of light and light backscattered by aerosols and air molecules.

Such a laser air-data system can be used for measuring metrics of air data of an atmosphere, such as, for example, the atmosphere outside an aircraft. The general principle of operation of laser air-data system 10 is to determine metrics of air-data based on the Doppler-shifted wavelength spectrum of a reflected portion of light backscattered by the aerosols and/or air molecules in the atmosphere. Such a reflected portion can be called a Doppler-shifted reflected portion, which has a combination (i.e., a sum) of the wavelength spectrum corresponding to light backscattered by aerosols in the atmosphere and the wavelength spectrum corresponding to light backscattered by air molecules of the atmosphere, as depicted in FIG. 1 above. In FIG. 2, laser air-data system 10 includes light projector 12, optical receiver 14, background-light rejection filter 16, background-light sampling filter 18, first optical detector 20, vapor cell filter 22, and second optical detector 24.

Light projector 12 projects a beam of light into projection volume 26 of the atmosphere. Projection volume 26 is determined by the optical design, location, and alignment of light projector 12. The projected beam of light generally is collimated by a collimating lens. Typically, the projected beam of light is of a distinct wavelength (i.e., narrow band emission), such as light generated by a laser. Moreover, light projector 12 can be tunable, thereby enabling the wavelength $\lambda_{PROJ}$ (t) (and frequency) of the projected beam of light to be swept over a projection wavelength band $\Delta_{PROJ}$ of wavelengths about a nominal wavelength or target wavelength $\lambda_{TARG}$. This is typically done in a triangular fashion, in which the wavelength $\lambda_{PROJ}$ (t) begins at a minimum wavelength $\lambda_{MIN}$, then is linearly swept up to a maximum value $\lambda_{MAX}$, and then is linearly swept down to the minimum wavelength $\lambda_{MIN}$. This is then repeated in periodic fashion. As the wavelength $\lambda_{PROJ}$ (t) of the projected beam of light is swept through wavelengths, the wavelengths of the Doppler-shifted wavelength spectrum of the Doppler-shifted reflected portion will be similarly swept.

Optical receiver 14 is configured to receive light from reception volume 28 of the atmosphere outside the aircraft. Reception volume 28 is determined by the optical design, location, and alignment of optical receiver 14. Reception volume 28 is aligned with projection volume 26 such that reception volume 28 intersects projection volume 26, thereby forming intersection volumes 30. Intersection volume 30 contains a region of the atmosphere capable of backscattering the beam of light projected by light projector 12 so as to be received by optical receiver 14. Any metrics of air data measured by laser air-data system 10 correspond to such a region of the atmosphere. The light received by optical receiver 14 includes both: i) a Doppler-shifted reflected portion of the projected beam backscattered by the atmosphere from within the intersection volume; and ii) a background-light portion from within the reception volume. The Doppler-shifted reflected portion is indicative of various air-data metrics due to Doppler shifting by the aerosols and air molecules within intersection volume 30 of the atmosphere. Optical receiver 14, however, receives not just the Doppler-shifted reflected portion but optical receiver 14 also receives background light, which is not the result of backscattering of the projected beam of light. Because the metrics of the air data are determined only from the Doppler-shifted reflected portion of the light received by optical receiver 14, any background light received by optical receiver 14 is a noise light signal. In many cases, the background-light portion can be large in comparison with the Doppler-shifted reflected portion, thereby making it difficult to determine the metrics of air data desired. Thus, it would be helpful if one could measure or estimate a magnitude of the background-light portion so as to ultimately excise (e.g., remove or subtract) the estimated background-light portion from the total light received by the optical receiver. Air-data system 10 addresses this problem in two ways, as will be described in more detail below. First, air-data system 10 uses background-light rejection filter 16 to reduce a spectral bandwidth of light to be processed to only pass-band wavelengths that include the Doppler-shifted reflected portion of the light received by optical receiver 14. Second, air-data system 10 estimates the amount of a pass-band limited amount of background light that is within the spectral bandwidth of light to be processed as permitted by background-light rejection filter 16, and then excises such an estimated amount during processing by air-data system 10.

The light received by optical receiver 14 is directed, via optical fiber 30 to background-light rejection filter 16. Background-light rejection filter 16 is configured to separate (e.g., separate) the light received by optical receiver 14 into a beam sampling portion (i.e., the portion to be used for measuring metrics of air data) and a complementary non-beam portion (a portion of which will be used to estimate the pass-band limited amount of background light remaining in the beam sampling portion). Such separation of portions is typically performed by using an optical filter that transmits one of these two portions while reflecting or diffracting the other of the two portions. Background-light rejection filter 16 has a pass-band wide enough to pass wavelengths of the Doppler-shifted wavelength spectrum of the Doppler-shifted reflected portion as part of the beam sampling portion but narrow enough to reduce or minimize the amount of background light included in the beam sampling portion. Although the pass-band of background-light rejection filter 16 filters much of the background light received by optical receiver 14, background-light rejection filter 16 still permits any background light having wavelengths that fall within the pass-band of background-light rejection filter 16 to be transmitted (or diffracted or reflected) along with the Doppler-shifted reflected portion. An estimate of the amount of background light that has wavelengths within the pass-band of background-light rejection filter 16 can be obtained by measuring the amplitudes of background light at wavelengths nearby but outside the pass-band of background-light rejection filter 16. Background light at wavelengths nearby but outside the pass-band of background-light rejection filter 16 are included in the complementary non-beam portion separated from the beam sampling portion by background-light rejection filter 16.

The complementary non-beam portion is used to estimate the amount or magnitude of background-light that remains within the beam sampling portion. To do so, background-light sampling filter 18 is configured to separate a background-light sampling portion (i.e., the portion that will be used to estimate the amount of background light remaining within the beam sampling portion) from the complementary non-beam portion. The background-light sampling portion includes wavelengths immediately adjacent to the pass-band wavelengths of the beam sampling portion. For example, in some embodiments, the background-light sampling portion has a wavelength band that extends both above and below the pass-band wavelengths of the beam sampling portion (i.e., wavelengths above and below the pass-band of the background-light rejection filter 16). In some embodiments, the background-light sampling portion includes only wavelengths on one side of wavelengths of the beam sampling portion. Such wavelengths of the background-light sampling portion, being so near to those within the beam sampling portion, can well represent, or at least are predictive of, any background light within the beam sampling portion. Such background light can include light directed along and within the reception volume 28 and originating from natural sources (e.g., the sun, moon, etc.) and/or light originating from artificial sources (e.g., aircraft lighting, building lighting, etc.). First optical detector 20 is configured to detect such a background-light sampling portion, thereby generating an electrical signal indicative of the amount of background light within the beam sampling portion.

The beam sampling portion of the light is filtered by background-light rejection filter 16 and transmitted, via optical fiber 32, through vapor cell filter 22, to second optical detector 24. The beam sampling portion includes the Doppler-shifted wavelength spectrum of the Doppler-shifted reflected portion. Because the wavelength $\lambda_{PROJ}$ (t) of the projected beam of light is swept in periodic fashion by light projector 12, the wavelengths of the Doppler-shifted wavelength spectrum of the Doppler-shifted reflected portion are being swept in periodic fashion as well. Vapor cell filter 22 is a very narrow pass-band or stop-band filter so as to only pass or block only a very narrow-band portion of the Doppler-shifted wavelength spectrum of the Doppler-shifted reflected portion. In response to sweeping the wavelength $\lambda_{PROJ}$ (t) of the projected beam of light, the wavelengths of the Doppler-shifted wavelength spectrum of the Doppler-shifted reflected portion are being swept through a characteristic wavelength $\lambda_{VCF}$ (i.e., a central wavelength of the very narrow pass-band or stop-band of vapor cell filter 22) of vapor cell filter 22. Thus, as the wavelengths of the Doppler-shifted reflected portion are being swept through this characteristic wavelength $\lambda_{VCF}$ of vapor cell filter 22, only those wavelengths within the pass-band or stop-band region of vapor cell filter 22 will be passed or blocked, respectively. In both cases (i.e., for both pass-band and stop-band configurations), the Doppler-shifted wavelength spectrum of the Doppler-shifted reflected portion will be converted to a temporal response exhibiting temporal pulses. Such temporal pulses will have the same or similar profile (or shape) as the profile of the Doppler-shifted wavelength spectrum of the Doppler-shifted reflected portion. Second optical detector 24 is configured to detect such the beam sampling portion as filtered by vapor cell filter 22, thereby generating an electrical signal indicative of the Doppler-shifted wavelength spectrum of the Doppler-shifted reflected portion. In such a manner, the Doppler-shifted wavelength spectrum of the Doppler-shifted reflected portion can be determined.

Although second optical detector 24 generates an electrical signal indicative of the Doppler-shifted wavelength spectrum of the Doppler-shifted reflected portion, the electrical signal generated also includes a portion indicative of a fraction of the beam sampling portion pertaining to background light having wavelengths within the pass-band of background-light rejection filter 16. To correct for the amount of background light remaining within the beam sampling portion, an air-data processor is used. Such an air-data processor can be any processor capable of performing such electrical signal processing as will be described below. For example, the air-data processor can include any one or more of a microprocessor, a controller, a digital electrical signal processor (DSP), an application specific integrated circuit (ASIC), a field-programmable gate array (FPGA), or other equivalent discrete or integrated logic circuitry. The air-data processor can be configured to receive both the electrical signal generated by first optical detector 20 and the electrical signal generated by second optical detector 24. The air-data processor estimates the amount of the electrical signal generated by second optical detector 24 that pertains to background light remaining within the beam sample portion. The air-data processor estimates such remaining amount of background light based on the electrical signal generated by first optical sensor 20, which is indicative of the amount of background light at wavelengths nearby those of the background light remaining in the beam sampling portion. The air-data processor then subtracts the estimated amount from the electrical signal generated by second optical detector 24, leaving an electrical signal indicative of only the Doppler-shifted wavelength spectrum of the Doppler-shifted reflected portion.

Because the Doppler-shifted reflected portion of the light received by optical receiver 14 is generated by backscattering within intersection volumes 30, location of the intersection volumes 30 determines a location where the metrics of the air data pertain. For example, for airspeed metrics, intersection volume 30 can be designed to exclude the boundary layer adjacent to the aircraft (e.g., locations within a minimum distance of about a meter from the aircraft), where the air has been perturbed by the aircraft. Such control of location of intersection volume 30 is performed by locating optical receiver 14 at a predetermined distance from light projector 12 and canting directions of the reception volume 28 and projection volume 26 into one another (e.g., by a few degrees). In such a configuration, intersection of the projection and reception volumes will not begin until some predetermined distance from the aircraft, so as to exclude the boundary layer. Such control of locations of intersection volume 30 can be performed so as to maximize sensitivity and accuracy as determined by computational fluid dynamics analyses.

Laser air-data system 10 can distinguish between Mie scattering and Rayleigh scattering portions of the reflected light. Because the motion of air molecules in the atmosphere has broad distribution due to random motion of air molecules, Rayleigh scattering by the air molecules in the atmosphere will result in a much broader wavelength spectrum than the wavelength spectrum resulting from Mie scattering by the aerosol particles in the atmosphere. Thus, a Mie-scattering portion of the Doppler-shifted reflected portion has a very narrow band, which can be almost entirely stopped (or passed) by vapor cell filter 22, thereby causing very distinct pulses in the electrical signal generated by second optical detector 24. Conversely, even when the peak of the spectrum of the Rayleigh-scattering portion of the Doppler-shifted reflected portion is stopped (or passed) by the vapor cell filter 22, wavelengths of the Rayleigh-scattering portion that are outside the vapor cell filter's stop-band (or pass-band), but within the pass-band of the background-light rejection filter 16, will still be detected by second optical detector 24.

Although laser air-data system 10 is a single channel laser air-data system, such a system can be multiply implemented to form multi-channel air-data systems. A single channel air-data system can measure airspeed in one dimension, but multi-channel air data systems, if having channels aligned in directions that span three-dimensional space, can measure airspeed in three dimensions. Because of such multi-dimensional capability, aircraft-based air-data systems typically include three or more channels.

Figure 3:
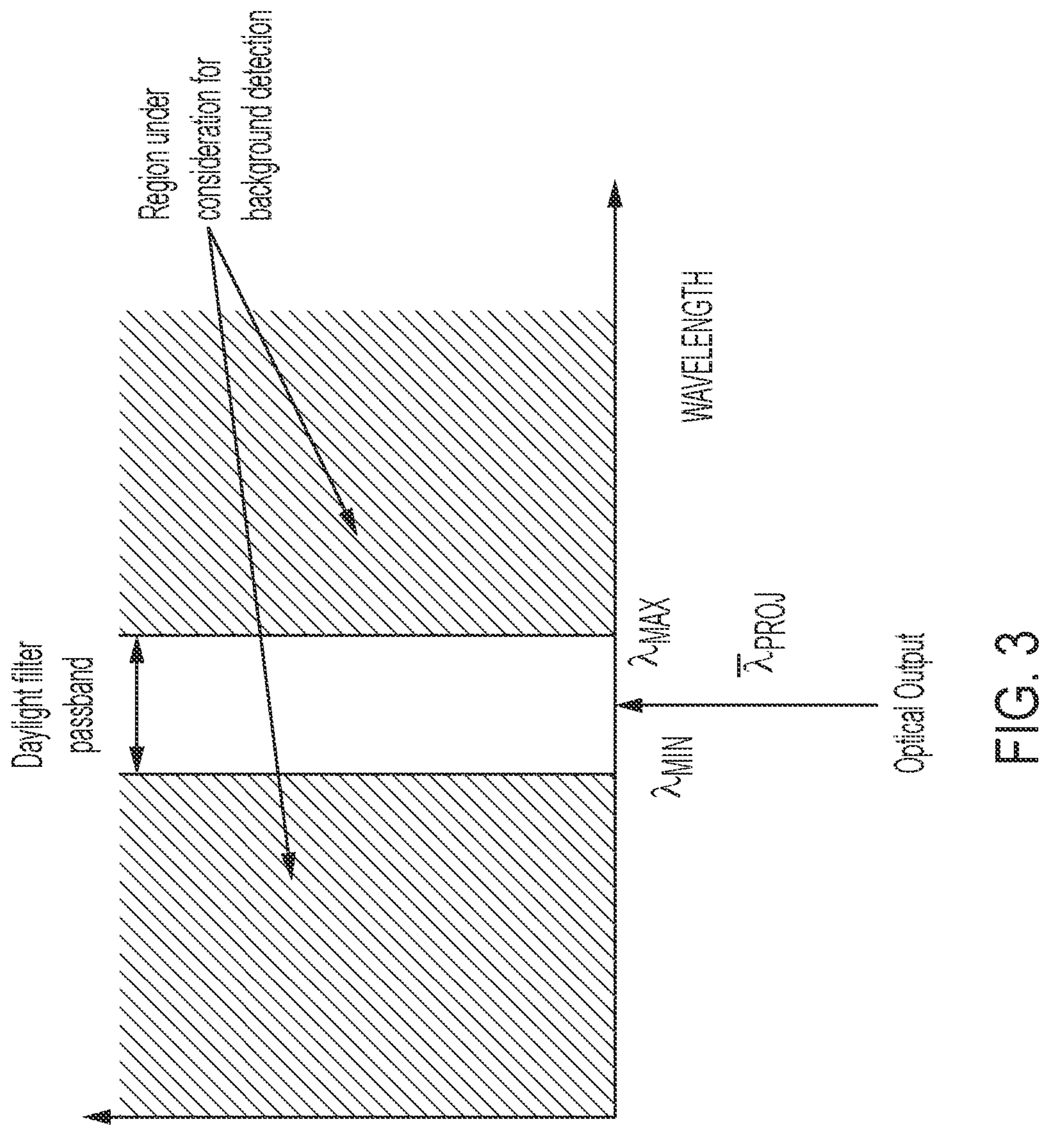
FIG. 3 is a chart showing a relationship between the pass-band of a background-light rejection filter the wavelength $\lambda_{PROJ}$ of the beam of light projected into the atmosphere.

FIG. 3 is a chart showing a relationship between the pass-band of background-light rejection filter 16 and the wavelength $\lambda_{PROJ}$ of the beam of light projected into the atmosphere by light projector 14. In FIG. 3, the pass-band of background-light rejection filter 16 includes the wavelength $\lambda_{PROJ}$ of the beam of light projected into the atmosphere by light projector 14. Light at wavelengths proximate but outside the pass-band of background-light rejection filter 16 can be used to estimate the background light within the pass-band. In some embodiments, light on one side or light on both sides can be used for such an estimate.

Figure 4:
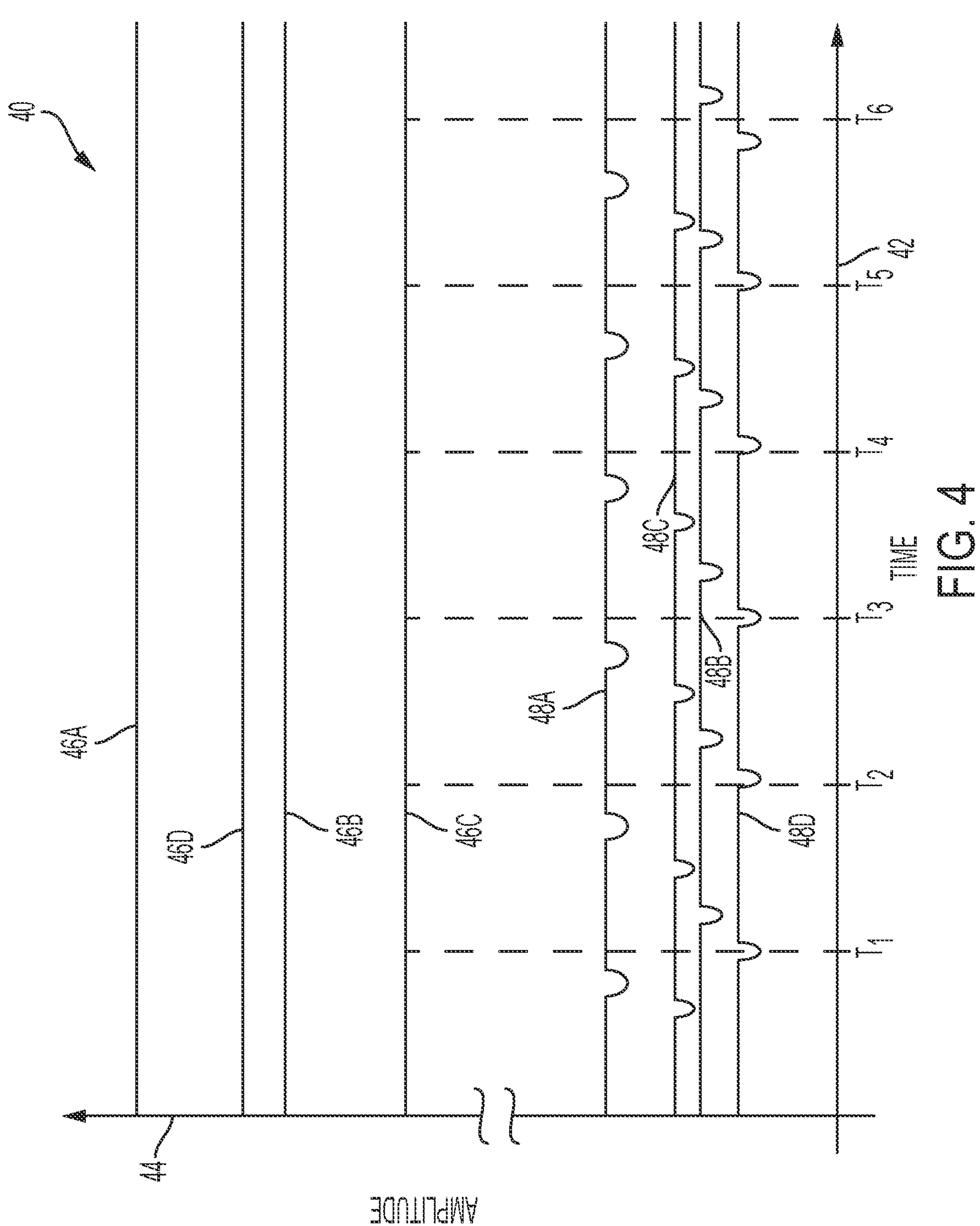
FIG. 4 is a graph depicting amplitude/time relations of electrical signals generated by optical detectors of a four-channel laser air-data system.

FIG. 4 is a graph depicting amplitude/time relations of electrical signals generated by optical detectors of a four-channel laser air-data system. In FIG. 4, graph 40 includes horizontal axis 42, vertical axis 44, first amplitude/time relations 46A-46D and second amplitude/time relations 48A-48D. Horizontal axis 42 is indicative of time, and vertical axis 44 is indicative of amplitude of electrical signals generated by first optical detectors 20A-20D or second optical detectors 24A-24D. The suffixes A-D identify to which of the four-channels each of the optical detectors belongs. Each of the four channels A, B, C, and D can be a single-channel laser air-data system, such as laser air-data system 10, as depicted in FIG. 2. Thus, optical detectors 20A and 24A correspond to optical detectors 20 and 24, respectively, of the channel A instantiation of laser air-data system 10, as depicted in FIG. 2. Each channel, however, is directed in a different direction from one another, thereby permitting determination of airspeed in three dimensions. Annotating the horizontal axis are times $T_1$-$T_6$ at which times the wavelength $\lambda_{PROJ}$ (t) of the projected beam of light is swept through and is equal to the characteristic wavelength $\lambda_{VCF}$ of vapor cell filters 22A-22D. First amplitude/time relations 46A-46D indicate the amplitudes of the electrical signals generated by first optical detectors 20A-20D, and second amplitude/time relations 46A-46D indicate the amplitudes of the electrical signals generated by second optical detectors 24A-24D. Each of first optical detectors 20A-20D is used for estimating the amplitude of the background light contribution to the electrical signal generated by the corresponding second optical detector 24A-24D. Each of first amplitude/time relations 46A-46D is relatively static, in that the swept projected beam contributes very little, if any, to the light detected by first optical detectors 20A-20D. Because each optical receiver 14A, 14B, 14C and 14D that receives the light that is detected by the corresponding first optical detectors 20A, 20B, 20C or 20D is pointed in a direction different from the others optical receivers, the amplitudes of amplitude/time relations 46A-46D can be different, one from another. For example, the background light contribution can be different in different directions.

Each of second amplitude/time relations 48A-48D has a dynamic component that is caused by the interaction of the wavelength sweep of the Doppler-shifted wavelength spectrum of the Doppler-shifted reflected portion and vapor cell filter 22A-22D. These dynamic components of the amplitude/time relations 48A-46D are indicative of various metrics of air data. Second amplitude/time relations 48A-48D are periodic as a result of the periodic nature of the projected beams of light (i.e., the sweeping of the wavelength). The peaks or valleys of each of the second amplitude/time relations 48A-48D are indicative of the relative airspeed in the vector directions of the reflection volumes. The relative airspeeds in such directions are determined by the Doppler shifts (i.e., frequency and wavelength shifts of the light backscattered by the aerosols and/or air molecules in relative motion to the aircraft) wavelength difference between the characteristic wavelength $\lambda_{VCF}$ of vapor cell filters 22A-22D and the wavelengths $\lambda_{PROJ}$ (t) of the projected beam of light at the time $t_{PEAK}$ of the peak. These relative airspeeds can then be linearly combined so as to generate airspeeds in the primary coordinate directions of the aircraft (e.g., forward/aft, lateral, and vertical).

Figure 5:
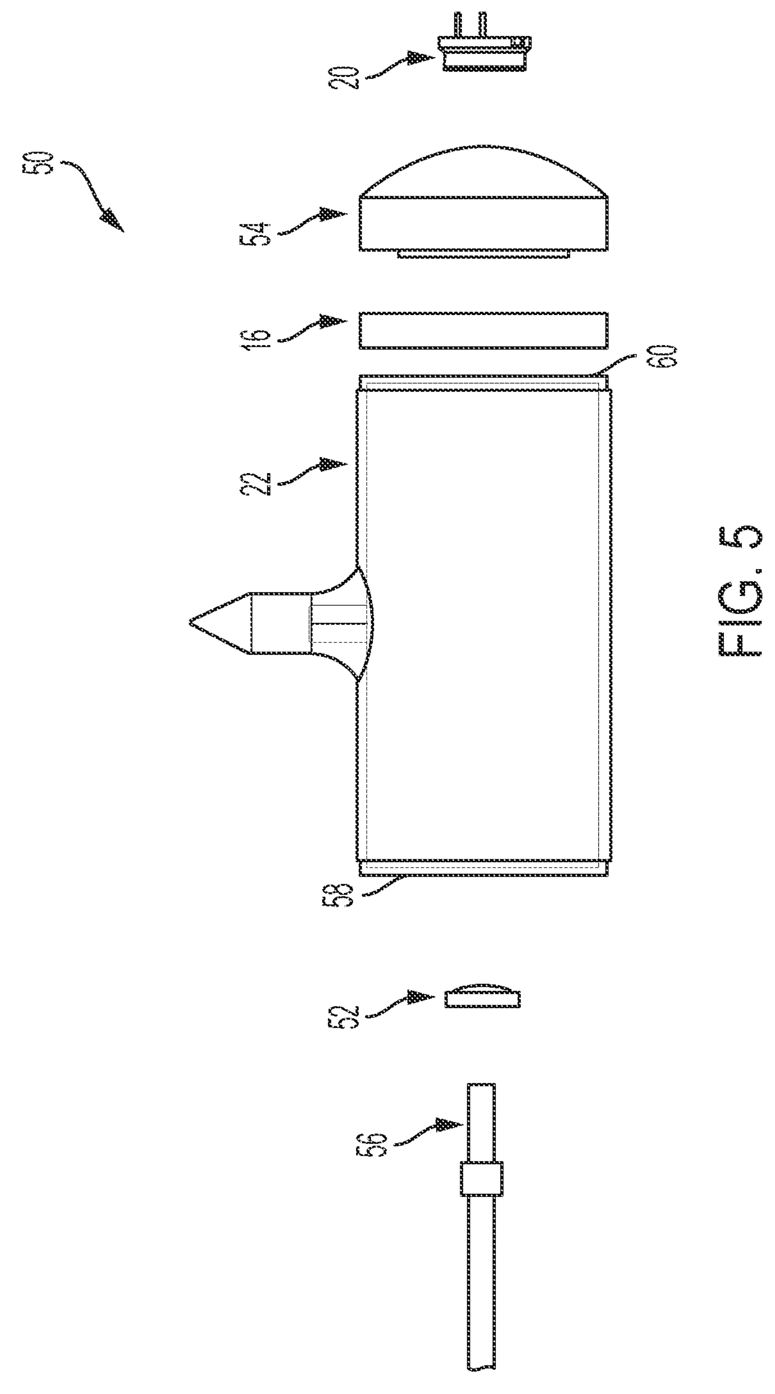
FIG. 5 is a schematic diagram of a reflective integrated filter for use in an air data probe.

FIG. 5 is a schematic diagram of a reflective integrated filter for use in a laser air-data system. In FIG. 5, reflective integrated filter 50 can replace laser-air data system 10 (as depicted in FIG. 2) of the following components: filter 16, background-light sampling filter 18, first optical detector 20, and vapor cell filter 22. Reflective integrated filter 50 includes collimating lens 52, vapor cell filter 22, background-light rejection filter 16, focusing lens 54, and first optical detector 20. The light received by optical receiver 14A is transmitted to reflective integrated filter 50 via optical fiber 56. The received light then diverges from a transmission face of optical fiber 56 and is collimated by collimating lens 52 to form a collimated beam, which is directed through first face 58 of vapor cell filter 22 and then through vapor cell 22. Vapor cell 22 is configured as a stop-band filter with a high-Q transmission spectrum. The valley of such a high-Q transmission spectrum defines the characteristic wavelength $\lambda_{VCF}$ of vapor cell filter 22. Vapor cell filter 22, having such high-Q transmission spectra, blocks only characteristic-wavelength portions of light passed therethrough. As the characteristic-wavelength portions of the Doppler-shifter wavelength spectrum of the Doppler-shifted reflected portion, which is directed through vapor cell filter 22, sweep through the characteristic wavelength $\lambda_{VCF}$ of vapor cell filter 22, the amplitudes of such characteristic-wavelength portions will be attenuated due to the high-Q transmission spectrum of vapor cell filter 22.

The light transmitted through (i.e., the portions not blocked thereby) and filtered by vapor cell filter 22 then emerges from the second face 60 of vapor cell filter 22. Such transmitted light is then filtered by background-light rejection filter 16, which is configured to filter (e.g., separate) the light by reflecting the beam sampling portion and transmitting the complementary non-beam portion. The complementary non-beam portion of the light, which transmits through background-light rejection filter 16 is focused by focusing lens 54 onto first optical detector 20. First optical detector 20 is configured to detect the complementary non-sampling sampling portion, which can be used to estimate the background-light contribution to the beam sampling portion of light reflected by background-light rejection filter 16. The beam sampling portion of light reflected by background-light rejection filter 16 again transmits through vapor cell filter 22, this time from second face 60 to first face 58. Because the beam sampling portion of the light is transmitted through vapor cell filter 22 two times, vapor cell filter 22 can be half as long as the corresponding vapor cell filter 22 of the embodiment depicted in FIG. 2. The light that emerges from the first face 58 of vapor cell filter 22 is then focused by collimating lens 52 onto optical fiber 56 which will transmit the optical electrical signal to the corresponding second optical detector 24A.

In some embodiments, background-light sampling filter 18 (as depicted in FIG. 2) can be interposed between background-light rejection filter 16 and first optical detector 20. Such a background-light sampling filter can be configured to filter a background-light sampling portion from the complementary non-beam portion. The background-light sampling portion includes wavelengths immediately adjacent to the beam sampling portion, but not those that are more removed from the wavelengths of interest. For example, in some embodiments, the background-light sampling portion has a wavelength band the extends both above and below wavelengths of the beam sampling portion as permitted by background-light rejection filters 16. In some embodiments, reflective integrated filter 50 can replace two channels, such as, for example, channels A and B or C and D. Such dual-channel operation can be obtained using a fiber optic combiner, for example. Such dual-channel use advantageously further reduces the size, number of elements, and/or cost of a laser air-data system.

Figure 6:
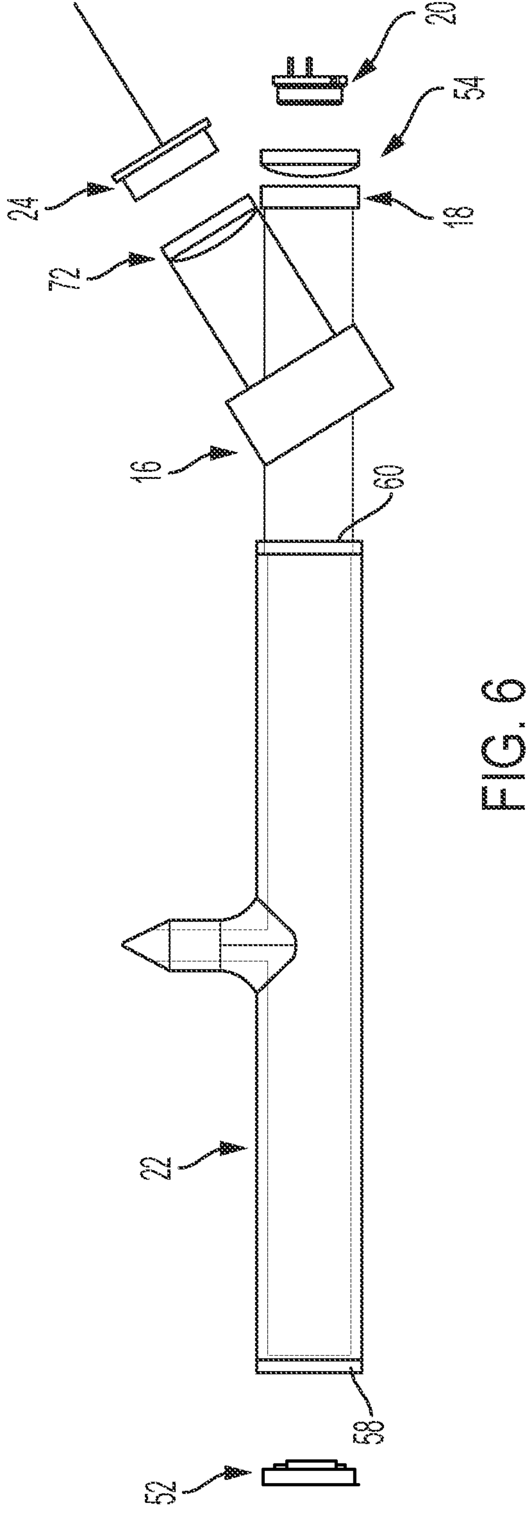
FIG. 6 is a schematic diagram of another embodiment of a reflective integrated filter for use in an air data probe.

FIG. 6 is a schematic diagram of another embodiment of a reflective integrated filter for use in a laser air-data system. In FIG. 6, reflective integrated filter 70 can replace laser-air data system 10 (as depicted in FIG. 2) of the following components: filter 16, background-light sampling filter 18, first optical detector 20, vapor cell filter 22, and second optical detector 24. Reflective integrated filter 70 includes collimating lens 52, vapor cell filter 22, background-light rejection filter 16, background-light sampling filter 18, first focusing lens 54, and first optical detector 20, second focusing lens 72, and second optical detector 24. The light received by optical receiver 14 is transmitted to reflective integrated filter 70 via optical fiber 56. The received light then diverges from a transmission face of optical fiber 56 and is collimated by collimating lens 52 to form a collimated beam, which is directed through first face 58 of vapor cell filter 22 and then through vapor cell 22. Vapor cell 22 is configured as a stop-band filter with a high-Q transmission spectrum. The valley of such a high-Q transmission spectrum defines the characteristic wavelength $\lambda_{VCF}$ of vapor cell filter 22. Vapor cell filter 22, having such high-Q transmission spectra, blocks only characteristic-wavelength portions of light passed therethrough. As the characteristic-wavelength portions of the Doppler-shifter wavelength spectrum of the Doppler-shifted reflected portion, which is directed through vapor cell filter 22, sweep through the characteristic wavelength $\lambda_{VCF}$ of vapor cell filter 22, the amplitudes of such characteristic-wavelength portions will be attenuated due to the high-Q transmission spectrum of vapor cell filter 22.

The light transmitted through (i.e., the portions not blocked thereby) and filtered by vapor cell filter 22 then emerges from the second face 60 of vapor cell filter 22. Such transmitted light is then filtered by background-light rejection filter 16, which is configured to filter (e.g., separate) the light by diffracting the beam sampling portion and transmitting the complementary non-beam portion. The complementary non-beam portion of the light, which transmits through background-light rejection filter 16 is filtered by background-light sampling filter 18. Background-light sampling filter 18 is configured to filter a background-light sampling portion from the complementary non-beam portion. The background-light sampling portion includes wavelengths immediately adjacent to the beam sampling portion, but not those that are more removed from the wavelengths of interest. For example, in some embodiments, the background-light sampling portion has a wavelength band the extends above and/or below wavelengths of the beam sampling portion as permitted by background-light rejection filters 16. The background-light sampling portion is then focused by first focusing lens 54 onto first optical detector 20. First optical detector 20 is configured to detect the background-light sampling portion, which can be used to estimate the background light contribution to the beam sampling portion diffracted by background-light rejection filter 16. The beam sampling portion diffracted by background-light rejection filter 16 is then focused by second focusing lens 72 onto second optical detector 24.

Figure 7:
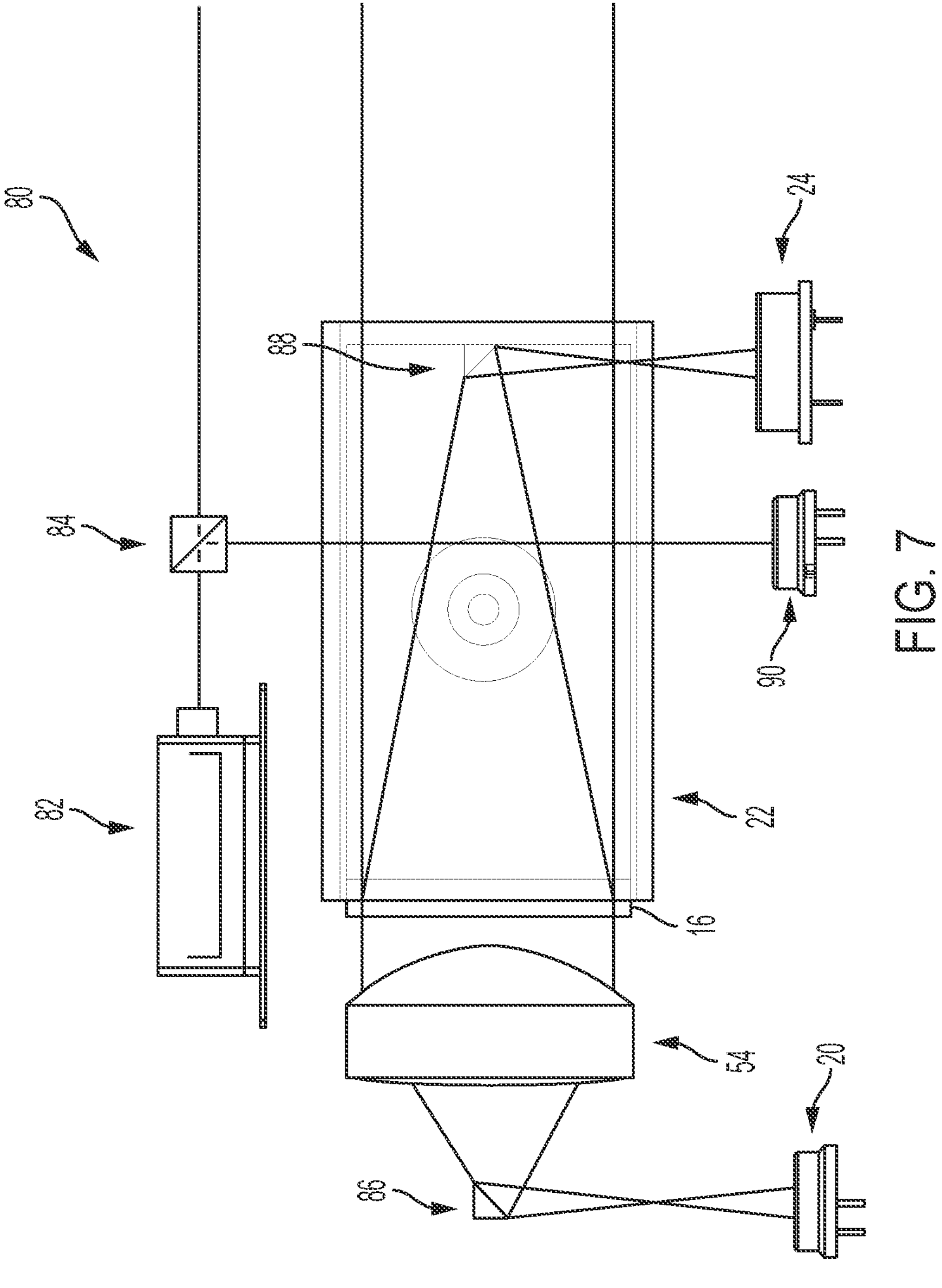
FIG. 7 is a schematic diagram of an optically integrated channel of an air data probe with a background-light rejection filter with a background-light sample detector.

FIG. 7 is a schematic diagram of an optically integrated channel of a laser air-data system with a background-light rejection filter with a background-light sample detector. In FIG. 7 air-data measurement channel 80 includes laser 82, beam splitter 84, vapor filter 22, background-light rejection filter 16, first reflecting mirror 86, first optical detector 20, second reflecting mirror 88, second optical detector 24 and third optical detector 90. Laser 82 is tunable so as to sweep the wavelengths of the projected beam, as explained above. In some embodiments, third optical detector 90 can be used to determine a reference time at which the wavelength of the projected beam of light is equal to the characteristic wavelength of the high-Q wavelength spectrum of vapor cell filter 22. Third optical detector 90 can also be used to determine the amplitude and/or wavelength $\lambda_{PROJ}$ (t) of the projected beam of light as a function of time. In some embodiments, laser 82 projects light through beam splitter 84, through which most of the light transmits and is projected into the atmosphere. A small portion of the light, however, is split by beam splitter 84 and directed through vapor cell filter 22 and onto third optical detector 90. Time differences between this reference time and times at which the amplitude of the electrical signal generated by second optical detector 24 is at a minimum can be used to determine relative airspeed.

Backscattered light, along with background light, is directed through vapor cell filter 22 and then filtered by background-light sampling filter 16. Background-light sampling filter 16 reflects a beam sampling portion and transmits a complementary non-beam portion through focusing lens 54 onto first reflecting mirror 86. First reflecting 86 directs the non-sampling portion onto first optical sensor 20. In some embodiments, background-light sampling filter 18 can be interposed between background-light rejection filter 16 and first optical detector 20. First optical detector generates an electrical signal indicative of the background light contribution to the beam sampling portion. The beam sampling portion is again reflected back through vapor cell filter 22 and onto second reflecting mirror 88. Second reflecting mirror 88 directs the beam sampling portion onto second optical detector 24.

Discussion of Possible Embodiments

The following are non-exclusive descriptions of possible embodiments of the present invention.

Some embodiments relate to a system for measuring air data of an atmosphere outside an aircraft. The system includes a light projector, an optical receiver, a background-light rejection filter and an air-data processor. The light projector is configured to project a beam of light into a projection volume of an atmosphere. The optical receiver is configured to receive light from a reception volume of the atmosphere. The reception volume and the projection volume form an intersection volume. The light received by the optical receiver includes: i) a Doppler-shifted reflected portion of the projected beam backscattered by the atmosphere from within the intersection volume; and ii) a background-light portion from within the reception volume. The background-light rejection filter is configured to separate the light received by the optical receiver into a beam sampling portion and a complementary non-beam portion. The beam sampling portion has band-pass wavelengths that include the Doppler-shifted reflected portion and a band-pass limited amount of background light. The complementary non-beam portion includes background light of wavelengths outside of the band-pass wavelengths. The air-data processor is configured to estimate the band-pass limited amount of the background light included in the beam sampling portion based on the complementary non-beam portion. The air-data processor is also configured to excise, from the beam sampling portion, the band-pass limited amount of the background light included in the beam sampling portion as estimated, thereby determining the Doppler-shifted reflected portion received by the optical receiver. The air-data processor is also configured to calculate metrics of the air data based on the Doppler-shifted reflected portion as determined.

The system of the preceding paragraph can optionally include, additionally and/or alternatively, any one or more of the following features, configurations and/or additional components:

A further embodiment of the foregoing system can further include a background-light sampling filter configured to separate a background-light sampling portion from the complementary non-beam portion. Estimating the band-pass limited amount of the background light included in the beam sampling portion can be based on the background-light sampling portion.

A further embodiment of any of the foregoing systems, wherein the background-light sampling portion includes wavelengths immediately adjacent to the band-pass wavelengths of the beam sampling portion.

A further embodiment of any of the foregoing systems can further include a first light detector, upon which the background-light sampling portion is directed. The first light detector can be configured to generate a first signal indicative of background-light sampling portion and to transmit the first signal as generated to the air-data processor.

A further embodiment of any of the foregoing systems, wherein the system is configured to be mounted to an aircraft. The light projector and optical receiver can be configured to generate the intersection volume such that the intersection volume does not include a boundary layer of the atmosphere adjacent to the aircraft.

A further embodiment of any of the foregoing systems, wherein the light projector can be configured to sweep the wavelength of the projected beam of light over a projection wavelength band, thereby causing the Doppler-shifted reflected portion to be wavelength swept in response.

A further embodiment of any of the foregoing systems, wherein the projected wavelength band can be within the band-pass wavelengths of the beam sampling portion.

A further embodiment of any of the foregoing systems can further include a vapor cell filter through which the beam sampling portion is transmitted, thereby filtering the beam sampling portion. The vapor cell filter can have a narrow pass-band or stop-band characterized by a characteristic wavelength that is within the band-pass wavelengths of the beam sampling portion.

A further embodiment of any of the foregoing systems can further include a second light detector, upon which the beam sampling portion is directed. The second light detector can be configured to generate a second signal indicative of the beam sampling portion as filtered by the vapor cell filter and to transmit the second signal as generated to the air-data processor.

A further embodiment of any of the foregoing systems, wherein the projection wavelength band can include the characteristic wavelength of the vapor cell filter, such that as the Doppler-shifter reflected portion of the light received by the optical receiver sweeps through the characterization wavelength of the vapor cell filter, thereby causing the second light detector to generate pulses that are indicative of a Doppler-shifted wavelength spectrum of the Doppler-shifter wavelength portion.

A further embodiment of any of the foregoing systems, wherein the metrics calculated by the air-data processor can include an air speed, which can be calculated based on wavelengths of the projected beam of light at times at which maxima of the pulses are generated by the second optical detector.

A further embodiment of any of the foregoing systems wherein the metrics calculated by the air-data processor can include an air particle concentration, which is calculated based on amplitudes of the pulses as generated by the second optical detector.

A further embodiment of any of the foregoing systems wherein the metrics calculated by the air-data processor can include an air temperature, which is calculated based on a breadth of the pulses as generated by the second optical detector.

Some embodiments relate to a method for measuring air data of an atmosphere outside an aircraft. In the method, a beam of light is projected, via a light projector, into a projection volume of an atmosphere. Light from a reception volume of the atmosphere is received, via an optical receiver. The reception volume of the optical receiver intersects the projection volume of the light projector, thereby forming an intersection volume. The light received by the optical receiver includes: i) a Doppler-shifted reflected portion of the projected beam backscattered by the atmosphere from within the intersection volume; and ii) a background-light portion of background light from within the reception volume. The light received by the optical receiver is filtered, via a background-light rejection filter, into a beam sampling portion and a complementary non-beam portion. The light received by the optical receiver is separated, via a background-light rejection filter, into a beam sampling portion and a complementary non-beam portion. The beam sampling portion has band-pass wavelengths that include the Doppler-shifted reflected portion and a band-pass limited amount of background light. The complementary non-beam portion includes background light of wavelengths outside of the band-pass wavelengths. The band-pass limited amount of the background light included in the beam sampling portion is estimated based on the complementary non-beam portion. The band-pass limited amount of the background light included in the beam sampling portion as estimated is excised from the beam sampling portion, thereby determining the Doppler-shifted reflected portion received by the optical receiver. Metrics of the air data are calculated based on the Doppler-shifted reflected portion as determined.

The method of the preceding paragraph can optionally include, additionally and/or alternatively, any one or more of the following features, configurations and/or additional components:

A further embodiment of the foregoing method can further include separating, via a background-light sampling filter, a background-light sampling portion from the complementary non-beam portion.

A further embodiment of any of the foregoing methods, wherein the background-light sampling portion can include wavelengths immediately adjacent to the band-pass wavelengths of the beam sampling portion.

A further embodiment of any of the foregoing methods can further include directing the background-light sampling portion upon a first light detector. The first light detector can generate a first signal indicative of background-light sampling portion, and transmit the first signal as generated to the air-data processor.

A further embodiment of any of the foregoing methods wherein the atmosphere, for which air data is measured is the atmosphere outside an aircraft. The projection volume and the reception volume can generate the intersection volume such that the intersection volume does not include the boundary layer of the atmosphere adjacent to the aircraft.

A further embodiment of any of the foregoing methods, wherein the light projector can be configured to sweep the wavelength of the projected beam of light over a projection wavelength band, thereby causing the Doppler-shifted reflected portion to be wavelength swept in response.

A further embodiment of any of the foregoing methods can further include generating, via a second light detector, a second signal indicative of the background-light sampling portion and to transmit the second signal generated to the air-data processor.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for measuring air data of an atmosphere, the system comprising:

a light projector configured to project a beam of light into a projection volume of an atmosphere;

an optical receiver configured to receive light from a reception volume of the atmosphere, the reception volume and the projection volume forming an intersection volume, wherein the light received by the optical receiver includes: i) a Doppler-shifted reflected portion of the projected beam backscattered by the atmosphere from within the intersection volume; and ii) a background-light portion from within the reception volume;

a background-light rejection filter configured to separate the light received by the optical receiver into a beam sampling portion and a complementary non-beam portion, the beam sampling portion having band-pass wavelengths that include the Doppler-shifted reflected portion and a band-pass limited amount of background light, the complementary non-beam portion including background light of wavelengths outside of the band-pass wavelengths; and an air-data processor configured to:

estimate the band-pass limited amount of the background light included in the beam sampling portion based on the complementary non-beam portion;

excise, from the beam sampling portion, the band-pass limited amount of the background light included in the beam sampling portion as estimated, thereby determining the Doppler-shifted reflected portion received by the optical receiver; and calculate metrics of the air data based on the Doppler-shifted reflected portion as determined.

2. The system of claim 1, further comprising:

a background-light sampling filter configured to separate a background-light sampling portion from the complementary non-beam portion, wherein estimating the band-pass limited amount of the background light included in the beam sampling portion is based on the background-light sampling portion.

3. The system of claim 2, wherein the background-light sampling portion includes wavelengths immediately adjacent to the band-pass wavelengths of the beam sampling portion.

4. The system of claim 3, further comprising:

a first light detector, upon which the background-light sampling portion is directed, the first light detector configured to generate a first signal indicative of background-light sampling portion and to transmit the first signal as generated to the air-data processor.

5. The system of claim 1, wherein:

the system is configured to be mounted to an aircraft, and the light projector and optical receiver are configured to generate the intersection volume such that the intersection volume does not include a boundary layer of the atmosphere adjacent to the aircraft.

6. The system of claim 1, wherein the light projector is configured to sweep the wavelength of the projected beam of light over a projection wavelength band, thereby causing the Doppler-shifted reflected portion to be wavelength swept in response.

7. The system of claim 6, wherein the projected wavelength band is within the band-pass wavelengths of the beam sampling portion.

8. The system of claim 7, further comprising:

a vapor cell filter through which the beam sampling portion is transmitted, thereby filtering the beam sampling portion, the vapor cell filter having a narrow pass-band or stop-band characterized by a characteristic wavelength that is within the band-pass wavelengths of the beam sampling portion.

9. The system of claim 8, further comprising:

a second light detector, upon which the beam sampling portion is directed, the second light detector configured to generate a second signal indicative of the beam sampling portion as filtered by the vapor cell filter and to transmit the second signal as generated to the air-data processor.

10. The system of claim 9, wherein the projection wavelength band includes the characteristic wavelength of the vapor cell filter, such that as the Doppler-shifter reflected portion of the light received by the optical receiver sweeps through the characterization wavelength of the vapor cell filter, thereby causing the second light detector to generate pulses that are indicative of a Doppler-shifted wavelength spectrum of the Doppler-shifter wavelength portion.

11. The system of claim 10, wherein the metrics calculated by the air-data processor includes:

an air speed, which is calculated based on wavelengths of the projected beam of light at times at which maxima of the pulses are generated by the second optical detector.

12. The system of claim 10, wherein the metrics calculated by the air-data processor includes:

an air particle concentration, which is calculated based on amplitudes of the pulses as generated by the second optical detector.

13. The system of claim 10, wherein the metrics calculated by the air-data processor includes:

an air temperature, which is calculated based on a breadth of the pulses as generated by the second optical detector.

14. A method for measuring air data of an atmosphere, the method comprising:

projecting, via a light projector, a beam of light into a projection volume of an atmosphere;

receiving, via an optical receiver, light from a reception volume of the atmosphere, the reception volume and the projection volume forming an intersection volume, wherein the light received by the optical receiver includes: i) a Doppler-shifted reflected portion of the projected beam backscattered by the atmosphere from within the intersection volume; and ii) a background-light portion from within the reception volume;

separating, via a background-light rejection filter, the light received by the optical receiver into a beam sampling portion and a complementary non-beam portion, the beam sampling portion having band-pass wavelengths that include the Doppler-shifted reflected portion and a band-pass limited amount of background light, the complementary non-beam portion including background light of wavelengths outside of the band-pass wavelengths;

estimating, via an air-data processor, the limited portion of the background light included in the beam sampling portion based on the non-beam sampling portion;

excising from the beam sampling portion, via an air-data processor, the band-pass limited amount of the background light included in the beam sampling portion as estimated, thereby determining the Doppler-shifted reflected portion received by the optical receiver; and calculating, via an air-data processor, metrics of the air data based on the Doppler-shifted reflected portion as determined.

15. The method of claim 14, further comprising:

separating, via a background-light sampling filter, a background-light sampling portion from the complementary non-beam portion.

16. The method of claim 15, wherein the background-light sampling portion includes wavelengths immediately adjacent to the band-pass wavelengths of the beam sampling portion.

17. The method of claim 16, further comprising:

directing the background-light sampling portion upon a first light detector;

generating, via the first light detector, a first signal indicative of background-light sampling portion; and transmitting, via the first light detector, the first signal as generated to the air-data processor.

18. The method of claim 14, wherein the atmosphere, for which air data is measured is the atmosphere outside an aircraft, wherein the projection volume and the reception volume generate the intersection volume such that the intersection volume does not include the boundary layer of the atmosphere adjacent to the aircraft.

19. The method of claim 14, wherein the light projector is configured to sweep the wavelength of the projected beam of light over a projection wavelength band, thereby causing the Doppler-shifted reflected portion to be wavelength swept in response.

20. The method of claim 19, further comprising:

generating, via a second light detector, a second signal indicative of the background-light sampling portion and to transmit the second signal generated to the air-data processor.

* * * * *